(12) United States Patent
Mishra et al.

(10) Patent No.: US 10,282,672 B1
(45) Date of Patent: May 7, 2019

(54) VISUAL CONTENT ANALYSIS SYSTEM WITH SEMANTIC FRAMEWORK

(71) Applicant: AMAZON TECHNOLOGIES, INC., Reno, NV (US)

(72) Inventors: Pragyana K. Mishra, Seattle, WA (US); Danny Guan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 727 days.

(21) Appl. No.: 14/316,031

(22) Filed: Jun. 26, 2014

(51) Int. Cl.
*G06N 99/00* (2010.01)
*G06N 20/00* (2019.01)

(52) U.S. Cl.
CPC .......... *G06N 20/00* (2019.01); *G06N 99/005* (2013.01)

(58) Field of Classification Search
None
See application file for complete search history.

(56) References Cited

U.S. PATENT DOCUMENTS

| | | | |
|---|---|---|---|
| 6,847,980 B1 * | 1/2005 | Benitez | G06F 17/30017 707/739 |
| 7,143,434 B1 * | 11/2006 | Paek | G06F 17/30858 345/619 |
| 7,254,285 B1 * | 8/2007 | Paek | G06K 9/4685 358/453 |
| 2013/0282747 A1 * | 10/2013 | Cheng | G06F 17/30023 707/758 |

* cited by examiner

*Primary Examiner* — Alexey Shmatov
*Assistant Examiner* — Robert Bejcek, II
(74) *Attorney, Agent, or Firm* — Lowenstein Sandler LLP

(57) ABSTRACT

A processing device determines a plurality of visual concepts for visual data based on at least one of visual entities in the visual data or feature-level attributes in the visual data, wherein the visual entities are based on the feature-level attributes, and wherein each of the plurality of visual concepts comprises a subject visual entity related to an object visual entity by a predicate. The processing device further determines one or more visual semantics for the visual data based on the plurality of visual concepts, wherein the one or more visual semantics define relationships between the plurality of visual concepts.

16 Claims, 8 Drawing Sheets

VISUAL CONTENT ANALYSIS SYSTEM WITH SEMANTIC FRAMEWORK

BACKGROUND

An enormous amount of visual data, in the form of videos and images, may be collected at Fulfillment Centers (FCs), warehouses and other corporate locations. The volume of visual data makes the task of finding relevant information overwhelming for users.

In existing visual content analysis systems, the triggering and registration of events is generally based on a manual definition and setting of rules and using low-level descriptors for detection and recognition of events or entities that defy or follow those rules. The retrieval of video data is based on querying by examples and measuring the similarity between stored exemplars (video or image descriptors) and low-level descriptors that are automatically extracted from the video or image data. However, generic low-level descriptors are often insufficient to discriminate content robustly and reliably at a conceptual level.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Figure 1:
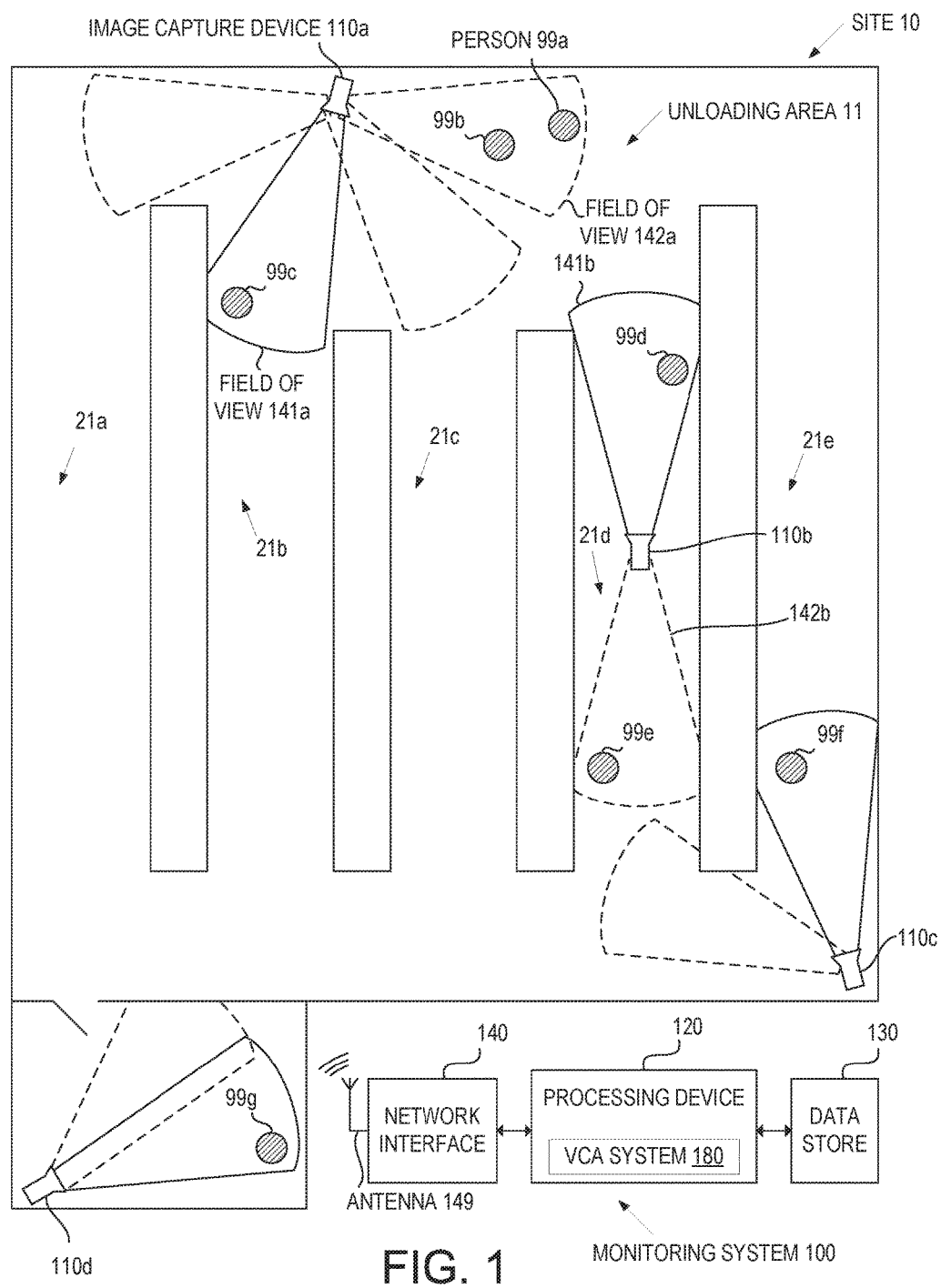
FIG. 1 illustrates an example site with a monitoring system that includes a visual content analysis subsystem, in accordance with one embodiment of the present invention.

Described herein is a visual content analysis system that determines visual concepts in visual data (e.g., video data and image data) and that further determines visual semantics in the visual data. Such visual concepts and visual semantics may then be used for event detection, monitoring, triggering of alarms, textual queries, business analytics, and so forth.

Large-scale dynamic environments such as fulfillment centers (FCs) and warehouses are teeming with packages, products, people, vehicles, machinery, and warehouse objects such as totes, trays, pallets and carts. Various inbound and outbound processes encompass activities and interactions between entities—packages, personnel, machinery, and vehicles—that move items from a receiving dock to various internal processes for the items and eventually to a shipping dock, e.g., for shipping packages to customers. Imaging device networks, e.g., camera networks, installed at these FCs observe these dynamic interactions and activities. However, there are currently no systems that can represent, conceptualize, and learn these dynamic processes. Existing visual content analysis (VCA) systems cannot reliably register these activities and interactions because these systems operate primarily at the level of identifying targets such as pedestrians, vehicles, and predefined objects. Moreover, existing VCA systems have neither a subjective understanding of a FC or warehouse environment nor any means to represent complex concepts that often involve interactions and relationships between specific entities.

Embodiments described herein provide a VCA system that can detect and recognize visual concepts and visual semantics associated with a particular environment. Visual concepts bridge the considerable difference between human users' high-level interpretation of visual information and the low level visual descriptors that are automatically extracted from videos or images. Visual concepts facilitate semantic indexing and concept-based retrieval of visual content. The detection and modeling of visual concepts improves ease of querying and also the accuracy of retrieval of relevant content in response to the queries.

Visual semantics formalizes dynamic interactions in an environment and represents them as semantic concepts that can be learned from visual data—video or images. The immediate business impact of using visual semantics includes efficient storage and retrieval of camera data, monitoring high retail value areas, predicting package overflows and bottlenecks, optimal placement of cameras, registering salient inbound and outbound events, and increased visibility of FC and warehouse activities. Additionally, video and image content can be correlated to specific inbound, stow, pick, pack or outbound activities of associates, and can therefore be efficiently retrieved in response to text or voice queries. Additionally, embodiments may provide a comprehensive semantic framework to process, store, and retrieve visual data, and subsequently extract meaningful interpretations of visual concepts that assist in real-time decision making for advanced automation of a FC or warehouse.

Embodiments described herein are directed to a VCA system that is trained to detect and recognize visual entities, visual concepts and visual semantics associated with a FC or warehouse environment. However, it should be understood that the VCA system described in embodiments may also be trained for other environments, such as traffic monitoring and control systems, retail stores, corporate campuses, schools, manufacturing facilities, amusement parks, and so forth. The specific visual entities, visual concepts and/or visual semantics associated with each of these different environments may vary, but the underlying techniques described herein for training the VCA system and the underlying mechanics of the VCA system may remain the same.

FIG. 1 illustrates an example site 10 (e.g., a fulfillment center (FC)) with a monitoring system 100 that includes a visual content analysis subsystem 180, in accordance with one embodiment of the present invention. The site 10 includes a number of different locations, including an unloading/loading area 11 and multiple aisles 21a-e. Other sites may have additional or fewer locations, and may have completely different configurations or layouts.

The site 10 is surveyed by monitoring system 100, which may be an automated monitoring system. The monitoring system 100 may have one or multiple image capture devices 110a-d that record visual data (e.g., images and/or video) of the site 10.

In one embodiment, the automated monitoring system 100 is a closed-circuit television (CCTV) system including a processing device 120 and/or data store 130 to which the image capture devices 110a-d send visual data. The processing device 120 may store the visual data in the data store 130. In one embodiment, the processing device 120 includes a visual content analysis (VCA) subsystem 180 that analyses visual data (e.g., image data and/or video data captured by image capture devices 110a-d) to determine feature-level attributes, visual entities, visual concepts and/or visual semantics for the visual data. The VCA subsystem 180 may generate metadata tags identifying the feature-level attributes, visual entities, visual concepts and/or visual semantics, and may store the metadata tags in data store 130. The metadata tags may also be transmitted to a remote data store and/or a remote computing device.

The image capture devices 110a-d may communicate with the processing device 120 via a network interface 140. In one embodiment, some or all of the image capture devices 110a-d communicate with the processing device 120 wirelessly via one or more antennas 149. Some or all of the image capture devices 110a-d may alternatively communicate with the processing device 120 via wired connections. Wired or wireless connections may include point-to-point (P2P), point to multipoint, or mesh wireless links, for example.

Located within the site 10 are a number of entities 99a-g, which may include persons, machines, packages, vehicles, and so forth. The entities 99a-g may move from one location of the site 10 to another throughout a workday. Each of the image capture devices 110a-d has a field of view which changes when the image capture device is moved from one position to another, and may be moved to any one of multiple different positions. In particular, image capture device may have a first field of view which surveys (or "images" or "views") a first area of the site 10 when the image capture device is in a first position and may have a second field of view which surveys a second area of the site 10 when the image capture device is in a second position.

The image capture devices 110a-d may generate a continuous or periodic stream of visual data that is provided to processing device 120 and/or data store 130. The visual data may contain images of the entities 99a-g moving throughout the site 10 over time. The image capture devices 110a-d at a fulfillment center may capture fulfillment processes and events, warehouse conditions, location and movement of inventory, personnel, vehicles, machinery, and objects such as pallets, cartons, packages, pods, trays, and totes.

VCA system 180 may analyze the visual data to determine visual concepts and/or visual semantics for the data in near-real time as the data is generated. Alternatively, VCA system 180 may analyze the visual data after it has been stored in data store 130. The visual concepts provide a semantic library of observable concepts that are part of a fulfillment process. The semantic vocabulary of visual concepts also enables FC automation to be aware of what to expect at various stages of inbound and outbound processes. The network of image capture devices 110a-d supported by the underlying semantic concepts will know where to look and what to look for as a product moves through inbound, stow, pick, pack and outbound processes.

Visual concepts encompass understanding and generating a vocabulary of activities, groupings, paths, occupancy, movement, and/or identification of various visual entities. Visual concepts provide a vocabulary of visual cues that describe attributes of detected objects in visual data. Visual semantics goes a step further than visual concepts, and defines relationships such as interdependence, causality, and independence between these disparate visual concepts. In doing so, visual semantics formalizes conceptual interpretations of video and image content that can be iterated upon and learned automatically over time.

The semantic layer of visual concepts and their relationships (visual semantics) constitute a knowledge base that can be leveraged to search for specific information in vast streams of visual data. It also enables the efficient storage, annotation, indexing, and retrieval of vast streams of video and images in terms of their information content. This not only reduces the overhead costs of storage and retrieval of visual content but also drastically reduces the time to retrieve relevant information. This optimal storage and retrieval of salient visual content also allows improvements in throughput while improving visibility of FC activities, inventory, and order status in real time. Additionally, event detection, monitoring, and triggering of alarms based on semantic understanding of observable interactions between humans, objects, vehicles and machinery may be accomplished using the visual semantics and visual concepts. For example, alarms may be triggered for an overflow of packages in a problem solve area, a package that has slipped off a conveyor belt, a quality control process in progress in an aisle, and so forth. Warehouse automation and organization may also be performed based on visual cues observed in visual data combined with a semantic understanding and/or vocabulary of visual concepts.

In one embodiment, each image capture device 110a-110d includes a distinct processing device that analyses visual data generated by that image capture device. Alternatively, one or more processing devices may process visual data from multiple image capture devices 110a-110d (as shown).

Figure 2:
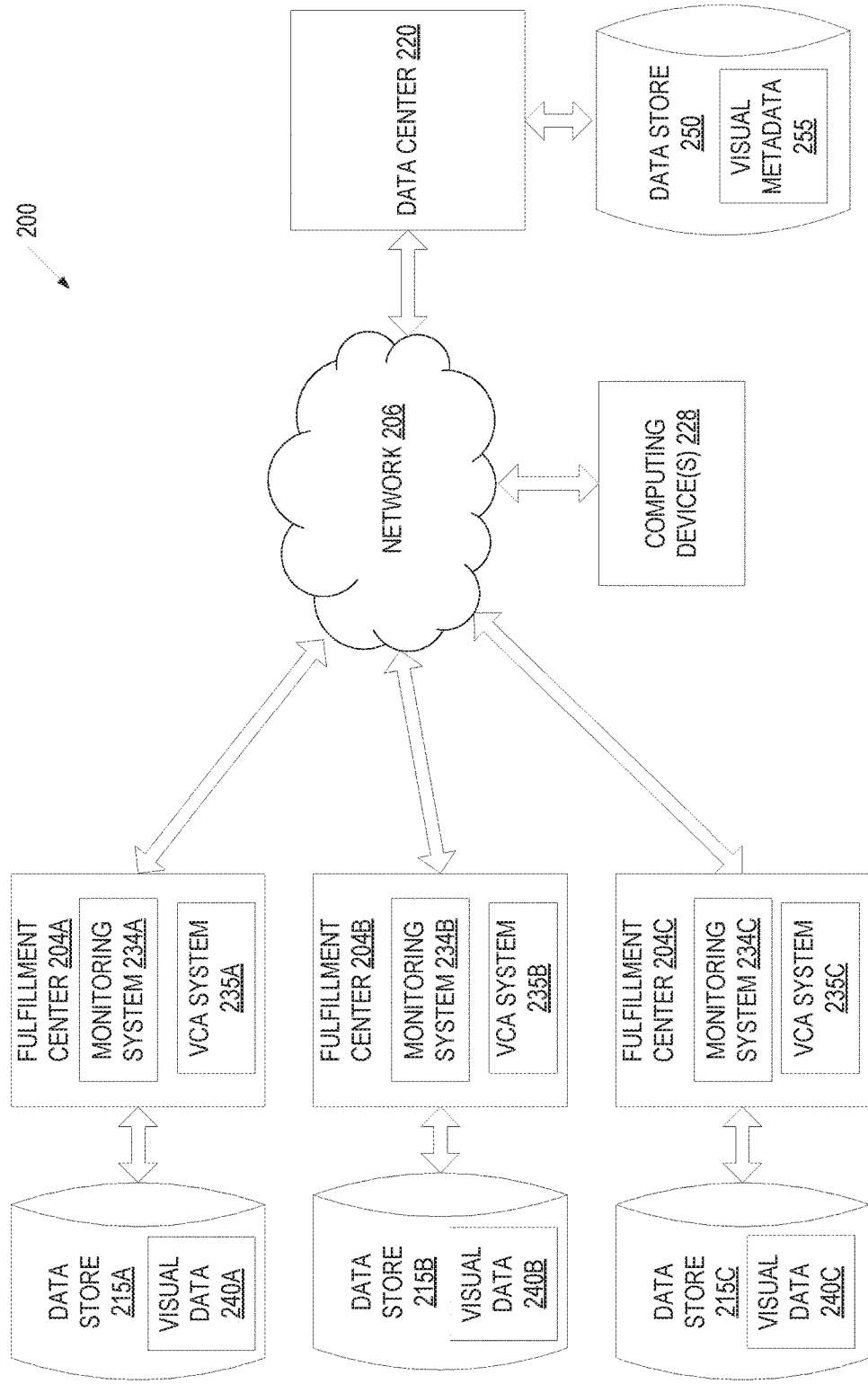
FIG. 2 is a block diagram example of a network architecture, in which embodiments of the present invention may operate.

FIG. 2 is a block diagram example of a network architecture 200, in which embodiments described herein may operate. The network architecture 200 may include a data center 220 connected to multiple fulfillment centers (FCs) 204a-c (or other sites) and one or more computing devices 228 via a network 206. Network 206 may be a public network such as the Internet, a private network such as a local area network (LAN), or a combination thereof.

Each of the FCs 204a-c may include a monitoring system 234a-c and a visual content analysis (VCA) system 235a-c, such as mentioned with reference to FIG. 1. Each of the monitoring systems 234a-c may generate large quantities of visual data 240a-c, which may be stored in local data stores 215a-c. The visual data 240a-c may additionally or alternatively be stored in external data stores, which may be the same as or different from data store 250. The VCA systems 235a-c may analyze the visual data 240a-c to determine feature-level attributes, visual entities, visual concepts and/or visual semantics to associate with the visual data. Each of the feature-level attributes, visual entities, visual concepts and/or visual semantics may be represented by visual metadata 255 such as metadata tags, which may be transmitted to the data center 220 for storage in a data store 250 of the data center 220. In one embodiment, metadata tags are used as an inverted index. For example, the metadata tags can each point to particular data streams (e.g., to a particular camera at a particular fulfillment center at a particular date and time). The metadata tags may have sizes of a few bytes to one or a few kilobytes, which is orders of magnitude smaller than the size of the visual data.

The data center 220 may include one or more machines (e.g., one or more server computers, routers, gateways, etc.) that have processing and storage capabilities to provide server-based functionality. Data center 220 may be implemented by a single machine or a cluster of machines, each of which may include data stores and/or other data processing equipment. In one embodiment, the data center 220 includes one or more network based servers, which may be hosted, for example, by network based hosting services. The data center 220 may include a data store 250 which may include data associated with a particular entity (e.g., a particular corporation).

The data center 220 may perform textual based queries on the visual metadata 255 without having access to the actual visual data 240a-c from which the visual metadata 255 was generated. Such queries may be generated internally or received from remote computing devices 228, which may be any type of computing device such as a mobile phone, tablet computer, desktop computer, laptop computer, rackmount server, and so forth. Queries may be formatted in the SPARQL or web ontology language (OWL) querying languages, or in other querying languages. Some queries may be associated with business analytics, and may be answered using only the visual metadata. For example, a query might be how many people worked on the second floor of an FC during the night shift of a particular day, which may be answered without retrieving the actual visual data. Other queries may be to identify relevant visual data 240a-c for retrieval. After relevant visual data 240a-c is identified, data center 220 may retrieve the identified visual data 240a-c from the appropriate fulfillment center 204a-c storing the visual data.

Figure 3:
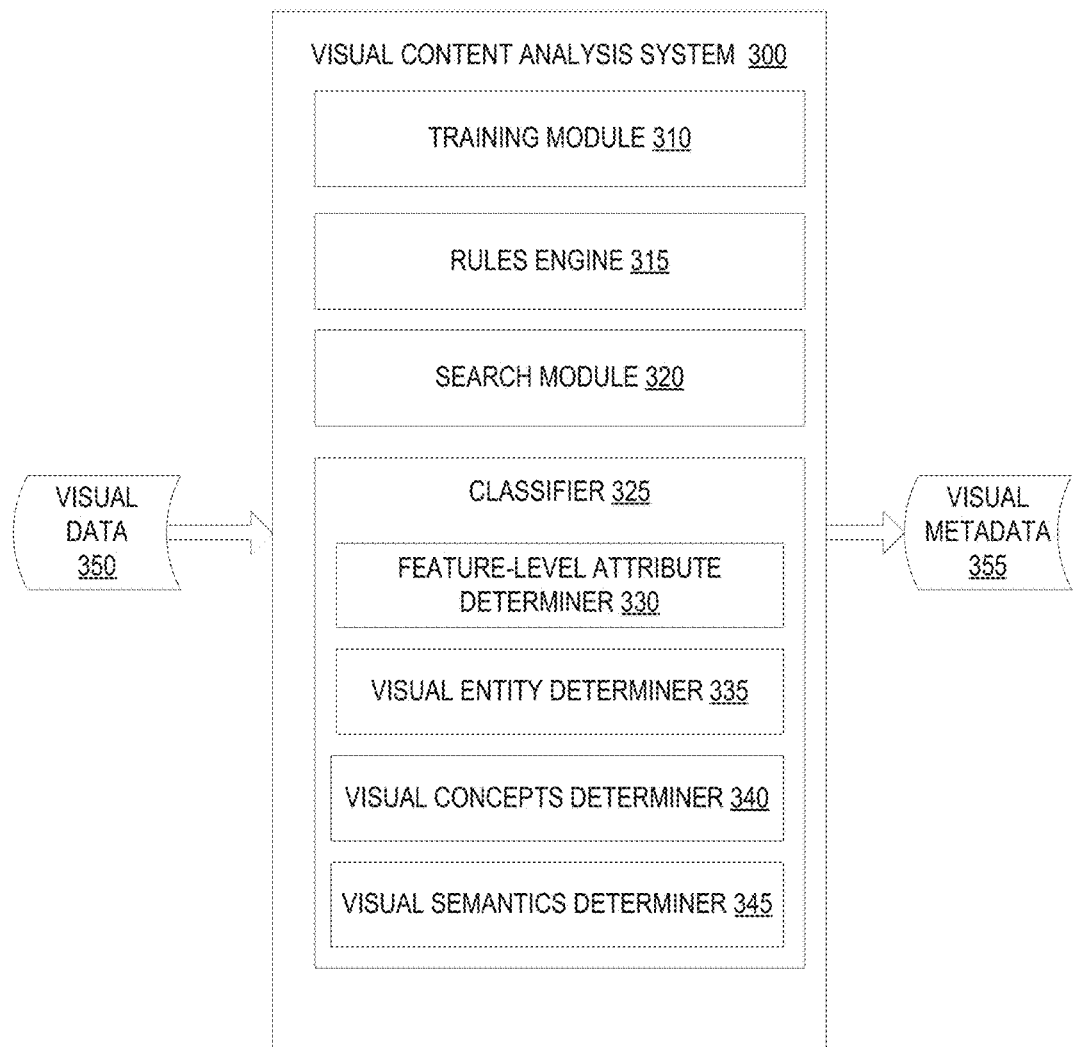
FIG. 3 is a block diagram of one embodiment of a visual content analysis system.

FIG. 3 is a block diagram of one embodiment of a visual content analysis system 300. In one embodiment, visual content analysis system 300 includes a training module 310, a rules engine 315, a search module 320 and a classifier 325. Alternatively, the visual content analysis system 300 may include only the classifier 325, or may include the classifier 325 plus one or more of the training module 310, rules engine 315 and/or search module 320.

Training module 310 analyzes a set of training visual data (e.g., training videos and/or images) to generate models and/or descriptors for numerous different feature-level attributes, visual entities, visual concepts and/or visual semantics. Training module 310 may use the training visual data as an input into one or more machine learning algorithms. The same or different types of machine learning algorithms may be used to generate the descriptors for feature-level attributes, visual entities, visual concepts and/or visual semantics. In one embodiment, feature-level attributes are defined first. Examples of feature-level attributes include color/blob, optical flow, hash of Gaussian (HOG), scale-invariant feature transform (SIFT), histograms, speeded up robust features (SURF), gradient location and orientation histogram (GLOH), hessians, maximally stable extreme regions (MSER), features from accelerated segment test (FAST), and binary robust independent elementary features (BRIEF).

Once descriptors have been generated for the feature-level attributes, descriptors may be generated for visual entities. The descriptors may act as specialized detectors to identify specific visual entities, such as people, vehicles, crowds, doors, etc.

After descriptors are generated for the visual entities, then descriptors may be generated for visual concepts. Visual concepts are combinations of visual entities that encapsulate interactions between the different visual entities. A visual concept may include a subject visual entity related to an object visual entity by a predicate. For example, the concept of storing may be a person visual entity linked to an object visual entity by the stow action. The descriptors for visual concepts may include rules that look for specific combinations of visual entities and/or feature-level attributes for generating and detecting concepts. One common approach for building these descriptors is to use discriminative methods, such as Support Vector Machines (SVMs), k-Nearest Neighbor classifiers, or decision trees, for learning a specific concept. In one embodiment, the effect of varying background, occlusions, and clutter may be reduced for attaining acceptable accuracy of detection by clustering local descriptors such as SIFT, SURF, FAST, BRIEF, or MSER descriptors from a set of interest points.

In one embodiment, MPEG-7 is leveraged for deriving content descriptors for foreground and background regions of interest (RoI). The descriptors for modeling visual concepts are, therefore, local low-level descriptors from RoI in the latest video frame and the background image. A RoI is a bounding box of contiguous pixels in the foreground; it is automatically derived by clustering motion pixels in the foreground. MPEG-7 motion, color, and texture descriptors may be used for the same RoI in foreground and background images to model visual concepts. While the foreground descriptors model dynamic entities, the corresponding background descriptors model attributes of the scene parts with which the dynamic entity is possibly interacting. Here we assume that the image region occluded by the foreground is characteristic of parts of a three dimensional (3D) scene with which the foreground entity is interacting.

In one embodiment, Kohonen maps, also known as self-organizing maps, are used to generate descriptors for visual concepts. Kohonen maps map high-dimensional descriptors into a low-dimensional (two-dimensional) space. A Kohonen map is a grid of tessellated cells. In one embodiment, the cells are organized in hexagonal form so that distances between any two adjacent cells are fixed on the map. Each cell is assigned an N-dimensional weight vector. Initial weights may be small random values.

During the learning process for a Kohonen map, the training module 310 first selects an input descriptor from a set of all training descriptors. The training module 310 then finds the cell (best matching unit) whose weights are closest to the input descriptor in the N-dimensional space. In one embodiment, Euclidian distance is used for this. However, other spaces may alternatively be used. The training module 310 then adjusts the weights of the best matching unit so that it becomes closer to the input descriptor in the N-dimensional space. The training module 310 subsequently updates the weights of the cells in the neighborhood of the best matching unit using a 2-D kernel, such as a Gaussian. This learning process goes through iterations until convergence or until all the updates approach zero. The positive sample in the training data for each visual concept is then mapped to a cell closest to its descriptor in the N-dimensional space.

Kohonen maps preserve the distance relationships between input descriptors for a concept as faithfully as possible, and similar descriptors that belong to a visual concept are progressively grouped together. Each visual concept mapping affects its surrounding cells; these class-conditional distributions are estimates of the true distributions of specific visual concepts in the discrete two-dimensional map space and not in the original high-dimensional descriptor space. This dimensionality reduction helps in reducing the computation cost of building new visual concept models. The map allocates different numbers of cells to inputs based on their occurrence frequencies. The more frequent input descriptors are mapped to larger domains at the expense of the less frequent concepts appearing in training data.

Descriptors may be generated for visual semantics after descriptors for the visual concepts have been created. The visual semantics encode relationships such as interdependence, causality, or independence between different visual concepts. For example, a visual semantics descriptor may link the visual concept of pushing <person, cart, move> to the visual concept of stowing <person, object, stow> with an interdependence relationship. In another example, a visual semantic descriptor may link the visual concept of pushing with the visual concept of moving <object, cart, move> by a causality relationship. Visual semantics may be combined to determine whole sequences of visual concepts. A semantic representation enables sensory systems, which form the perceptual basis of any FC or warehouse automation, to register observable events and activities that are part of a fulfillment process.

The types of feature-level attributes, visual entities, visual concepts and/or visual semantics for which the training module 310 generates definitions may be dependent on an environment from which the training visual data was taken. Alternatively, the output of each level of descriptors (e.g., feature-level attribute descriptors, visual entity descriptors, visual concepts descriptors, etc.) may be aggregated for the next higher level of descriptors.

Figure 7:
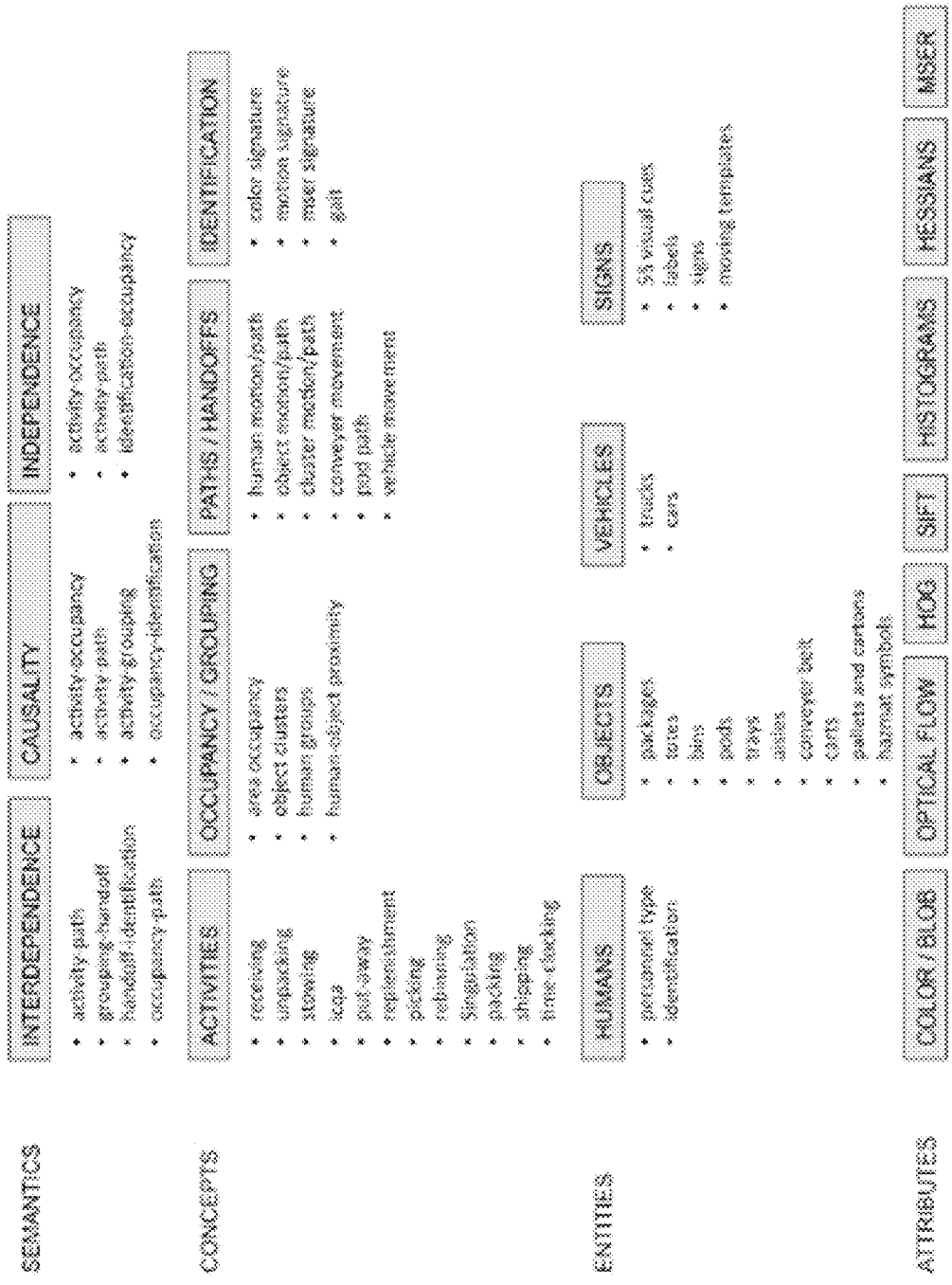
FIG. 7 is a table showing examples of feature-level attributes, visual entities, visual concepts and visual semantics.

FIG. 7 illustrates one example of feature-level attributes, visual entities, visual concepts and visual semantics that may be defined for a fulfillment center or warehouse environment. Visual entities in such an environment may be divided into the four broad categories of humans, objects, vehicles and signs. Definitions for visual entities of personnel type and identification may be generated under the humans visual entity class. Definitions for visual entities of packages, totes, bins, pods, trays, aisles, conveyor belts, carts, pallets, cartons, and hazmat symbols may be generated under the objects visual entity class. Definitions for trucks and cars may be generated under the vehicles visual entity class. Definitions for "5S visual cues", labels, signs and moving templates may be generated under the signs visual entity class.

Visual concepts in the FC or warehouse environment may be divided into at least four broad categories of activities, occupancy/grouping, paths/handoffs and identification. Definitions for visual concepts of receiving, unpacking, stowing, quality analysis, put-away, replenishment, picking, rebinning, singulation, packing, shipping and time-clocking may be generated under the activities visual concept class. Definitions for visual concepts of area occupancy, object clusters, human groups and human-object proximity may be generated under the occupancy/grouping visual concept class. Definitions for visual concepts of human motion/path, object motion/path, cluster motion/path, conveyor movement, pod path and vehicle movement may be generated under the paths/handoffs visual concept class. Definitions for visual concepts of color signature, motion signature, MSER signature and gait may be generated under the identification visual concept class.

Visual semantics in the FC or warehouse environment may be divided into at least three broad categories of interdependence, causality and independence. Definitions for visual semantics of activity-path, grouping-handoff, handoff-identification and occupancy-path may be generated under the interdependence visual semantics class. Definitions for visual semantics of activity-occupancy, activity-path, activity-grouping and occupancy-identification may be generated under the causality visual semantics class. Definitions for visual semantics of activity-occupancy, activity-path and identification-occupancy may be generated under the independence visual semantics class.

Returning to FIG. 3, the classifier 325 is populated with the models or descriptors generated by the training module 310. Classifier 325 receives input visual data 350, and analyzes the visual data to identify feature-level attributes, visual entities, visual concepts and visual semantics represented in the visual data.

Classifier 325 includes a feature-level determiner 330 that uses the feature-level descriptors/models to determine feature-level attributes in visual data 350. The feature-level attributes that may be identified in visual data include dynamic foreground feature-level attributes and static background feature-level attributes. In one embodiment, MPEG-7 descriptors are leveraged to determined feature-level attributes.

The dynamic foreground feature-level attributes may be determined using a motion activity descriptor, a region-based angular radial transformation (ART) descriptor, an average color descriptor, a color moments descriptor and a texture neighborhood descriptor. Feature level determiner 330 determines one or more foreground regions of interest (RoI), and applies these descriptors to determine the dynamic foreground feature-level attributes.

The motion activity descriptor encodes the overall activity level, motion, or action in a scene for a set of successive frames. This descriptor describes whether a foreground RoI is likely to be perceived by a viewer as being slow, fast paced, or action paced. The motion activity descriptor measures the intensity of motion based on standard deviations of motion vector magnitudes. The standard deviations may be quantized into five activity values. Direction of motion, spatial and temporal distributions can also be used as an extended descriptor.

The region-based angular radial transformation (ART) descriptor is a moment-invariant (region-based moments that are invariant to in-plane transformations) descriptor for RoI that can be best described by shape regions rather than contours. The ART is defined on a unit disk in polar coordinates and coefficients of the ART-basis functions are quantized, which makes this descriptor compact (140 bits/region) and very robust to segmentation noise. The average color, color moments and texture neighborhood descriptors are explained below because they are also used for extracting the background RoI descriptors.

The static background feature-level attributes may be determined using a color layout descriptor, a color structure descriptor, a dominant color descriptor, a scalable color descriptor, an edge histogram descriptor and a homogenous texture descriptor. Feature level determiner 330 determines one or more background regions of interest (RoI), and applies these descriptors to determine the static background feature-level attributes.

The color layout descriptor is simple resolution-independent descriptor based on discrete cosine transform (DCT) transformation in YCbCr space. An input image region is partitioned into blocks. Each block is changed to the mean of its color components and a DCT transform is applied to the blocks. In one embodiment, a zigzag scanning and weighting yields the spatial layout of color.

The color structure descriptor uses a spatial structuring element when compiling the color histogram in Hue-Max-Min-Difference color space. Hence, the spatial structure in which the different colors appear is incorporated into the representation. A 4×4 kernel is passed over the image and the color channel bins are incremented if a color is present.

The dominant color descriptor clusters colors in a RoI into a small number of representative colors in LUV color space using the generalized Lloyd algorithm. The connected-components algorithm joins neighborhoods of the same dominant colors to generate spatially homogeneous colors. The descriptor consists of the representative colors, their percentages in a region, spatial coherency of the color, and color variance. The color values have a resolution of 5 bits/channel, as do the percentage and spatial homogeneity components.

The scalable color descriptor uses a Haar transformation of the color histogram, performed in HSV color space. The output is the high and low-pass coefficients from the transform. This representation is quantized into 32 eight-bit values per image region, which makes it fast for indexing and quick queries.

The edge histogram descriptor captures spatial distribution of edges by dividing the RoI into non-overlapping equal-size blocks. Edge information is then calculated for each block in vertical, horizontal, 45°, 135°, and non-directional orientations. It is expressed as a 5-bin histogram, one for each image block. The descriptor is scale invariant. It is also very compact because each histogram bin is non-uniformly quantized using 3 bits, resulting in a descriptor size of 240 bits.

The homogeneous texture descriptor describes directionality, coarseness, and regularity of patterns in a RoI. The homogenous texture descriptor is based on a filter bank approach that employs scale and orientation-sensitive filters. Mean and standard deviation of image pixels are calculated and combined into a descriptor vector with the means and energy deviations computed in each of the 30 frequency channels. Thus, a feature vector of 62 dimensions is extracted from each image RoI.

Classifier 325 includes a visual entity determiner 335 that uses the visual entity descriptors/models and the determined feature-level attributes to determine visual entities in visual data 350.

Classifier 325 includes a visual concepts determiner 340 that uses the visual concepts descriptors/models together with the determined feature-level attributes and determined visual entities to determine visual concepts in visual data 350. Visual concepts encompass understanding and generating a vocabulary of activities, groupings, paths, occupancy, movement, and/or identification of various visual entities.

Classifier 325 includes a visual semantics determiner 345 that uses the visual semantics descriptors/models together with the feature-level attributes, visual entities and/or visual concepts to determine visual semantics in visual data 350. Visual semantics goes a step beyond visual concepts, and defines relationships such as interdependence, causality, and independence between disparate visual concepts. In doing so, visual semantics formalizes conceptual interpretations of video and image content that can be iterated upon and learned automatically over time.

Once classifier 325 has generated visual metadata 355 from the visual data 350, this visual metadata can be used to perform numerous optimizations and to apply business logic to the visual data 350. Such business logic may be implemented by a rules engine 315, which may process visual metadata as it is generated or afterwards. For example, rules engine 315 may specify that alerts should be generated when visual data 350 satisfying some criteria are identified. For example, rules engine 315 may apply a rule to generate an alert if a moving object is detected in a particular aisle during a particular time. In another example, rules engine 315 may apply a rule to generate an alert if a "package occupies" visual concept is detected in a problem site area more than a threshold number of times in an hour. In another example, rules engine 315 may specify that visual data that fails to include any or particular visual semantics tags is not to be stored or is to be deleted. For example, rules engine 315 may specify that only semantically rich data (e.g., data that includes semantic metadata tags) is to be stored. Rules engine may perform ranking and relevance calculations based on semantic content, and store visual data meeting a threshold. Many other possibilities are also possible, a few of which are set forth below.

A fulfillment center or warehouse may have anywhere from 500 to 1200 imaging devices, e.g., video cameras. These video cameras may produce data at 2 Mega-bits-a-second (Mbps) or 5 Mbps at frame rates of 10 frames per second (fps). A network of 500 video cameras produces over 10 terabytes (TB) of data every day. For a video camera looking down an aisle, most of the collected video does not have any activity or event. If there is an hour of activity over the duration of a day in that aisle, there is hardly 400 gigabytes (GB) of data that potentially has some information of activity. Storing these sifted data streams considerably reduces the amount of data that is stored in a data store, which in turn reduces costs while increasing the period of time for which the data can be retained due to increased storage capacity. Storing content-rich data also facilitates the efficient retrieval and transfer of data outside the local data stores to a data center for processing.

Videos from multiple cameras are annotated with conceptual labels (metadata tags) for activities such as "receiving", "unpacking", "stowing", "quality assurance", "put-away", "replenishment", "picking", "rebinning", "singulation", "packing", "shipping" in near real time. These can be correlated or mapped to manual scans of bins and packages by the rules engine 315 for improved visibility of FC or warehouse activities and inventory. In addition, annotating videos with conceptual labels allows categorization of video segments into semantic categories that have business significance. A few examples of such categories are "Overflow in Problem-Solve Station", "Quality Analysis in Progress", "Line at Security Checkpoint", "Loading Truck in Outbound Dock", and so forth.

Visual semantics interprets human movement and actions during activities such as stowing, inventory control, quality assurance, and picking, and can be used for analyzing and posting performance metrics by the rules engine 315 on a daily or weekly basis.

Process and technology changes can be analyzed and refined on a daily basis. Causality and correlation between different events at the FC or warehouse can be determined across all inbound and outbound processes as the events occur. The ability to make adjustments and respond to any disruptions or bottlenecks in time, especially during peak periods, can avoid any impact to performance and throughput.

Search module 320 may perform searches for visual data 350 having associated visual metadata (e.g., metadata tags) that meet a specified textual search query. This provides increased efficiency in querying and analyzing visual data. In conventional VCA systems, video and image data cannot be searched based on query terms. For example, searching for events or activities forensically for theft or anomalies in video streams takes many hours and is prone to misses due to monotony; sifting through one day-long video at twice the speed on four monitors takes 3 hours where much of the video stream has little information content. Automatic annotation of video streams enables segments of those streams to be indexed and queried. As a result, retrieving images and videos in response to text queries makes diagnostics feasible and efficient. For example, a query may ask for all instances of visual data including the visual concept of a person stowing or a person walking in an aisle. A query may additionally ask for a join of the visual concept for a person moving in an aisle and the visual concept of an item moving in an aisle. By joining these two with visual semantics, the search module 320 is able to identify all sequences in which a person walked to an aisle without a cart and walked out with a moving object.

One of the goals of modeling FC or warehouse processes in video is to query and retrieve relevant content for a specific information need of the user. Conventional approaches leverage textual descriptions, keywords, and metadata corresponding to rules and pre-specified occurrences of visual patterns; this requires manual annotation and does not scale well to large and diverse video footage. Additionally, in the absence of well-defined metadata or metadata that adequately captures the essential content of a video segment, these conventional approaches fail. Content-based queries are typically based on a small set of pre-specified examples and their annotations, which can be termed as query-by-example. In one embodiment, visual concepts combine this content-based technique with Kohonen Maps for representing and learning various visual concepts, and enables query-by-concept for video.

The fundamental problem of automatic concept-driven video retrieval is how to map the user's information request or query into the space of available concepts in the underlying concept ontology. There are three categories of mapping queries to concepts: text-based, visual example-based, and concept based. Text-based mapping of query words to concepts uses lexical analysis of the textual query and an underlying ontology. Methods involving visual examples use the similarity between specified example objects and concept detectors to identify relevant concepts. Query-by-concept enables users to retrieve content by predefined semantic concepts that are intuitive to users. Text-based and concept-based queries are provided in embodiments.

Figure 4:
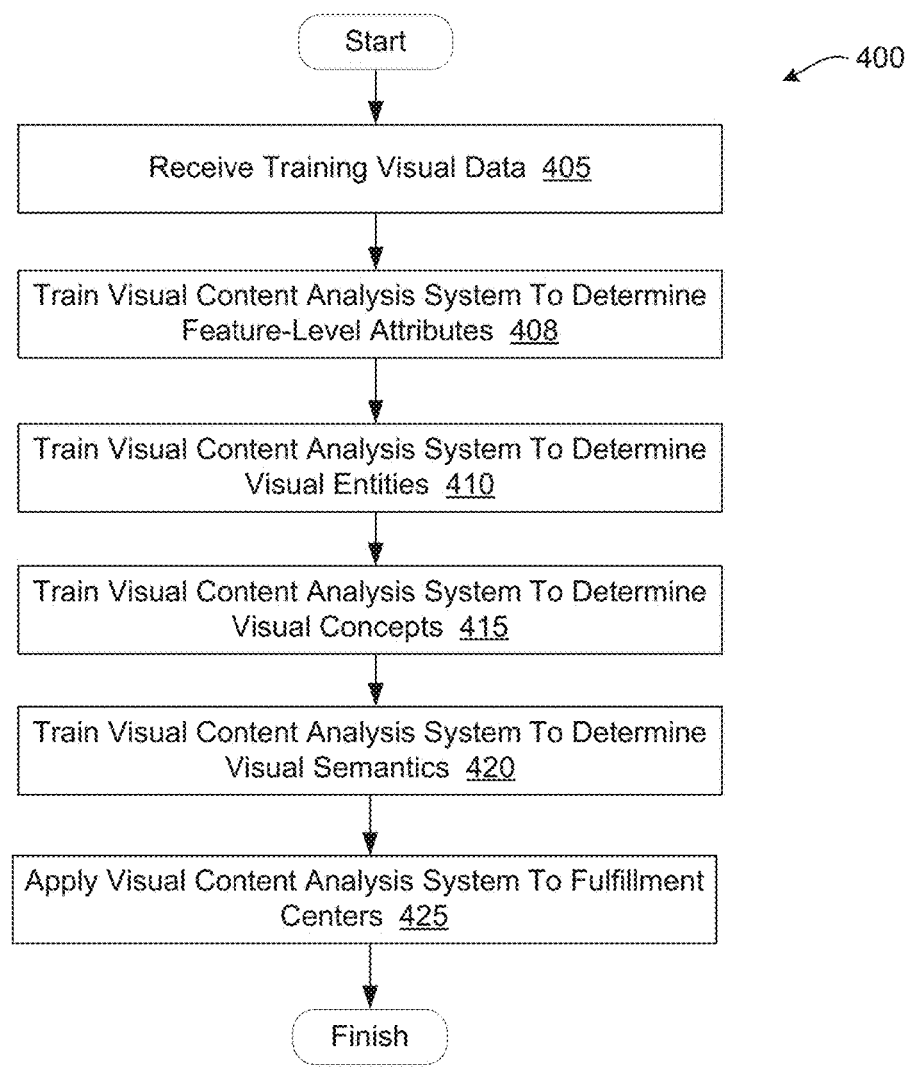
FIG. 4 is a flow diagram of one embodiment for a method of training a visual content analysis system using machine learning.
Figure 5:
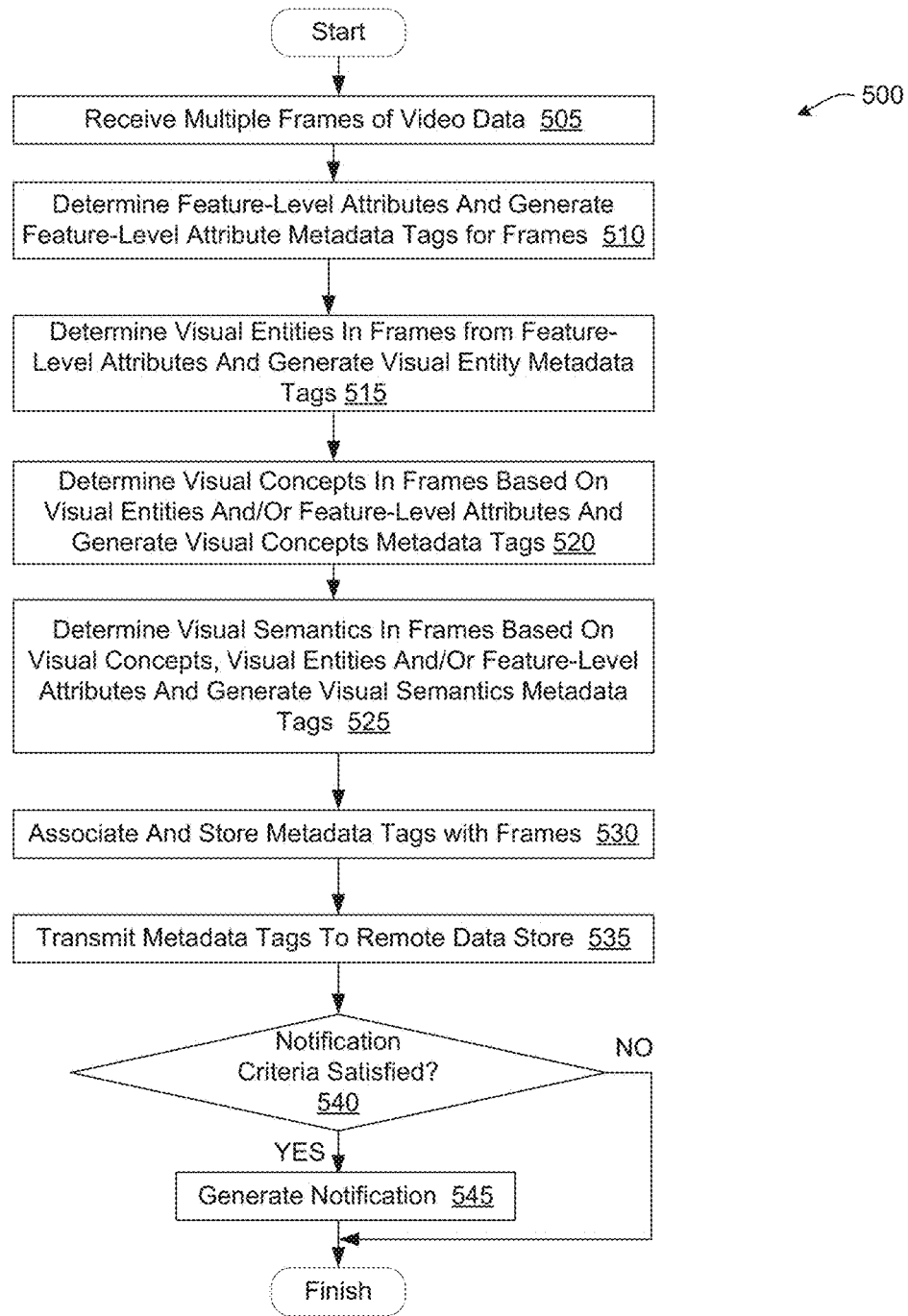
FIG. 5 is a flow diagram of one embodiment for a method of applying a visual content analysis system to visual data.
Figure 6:
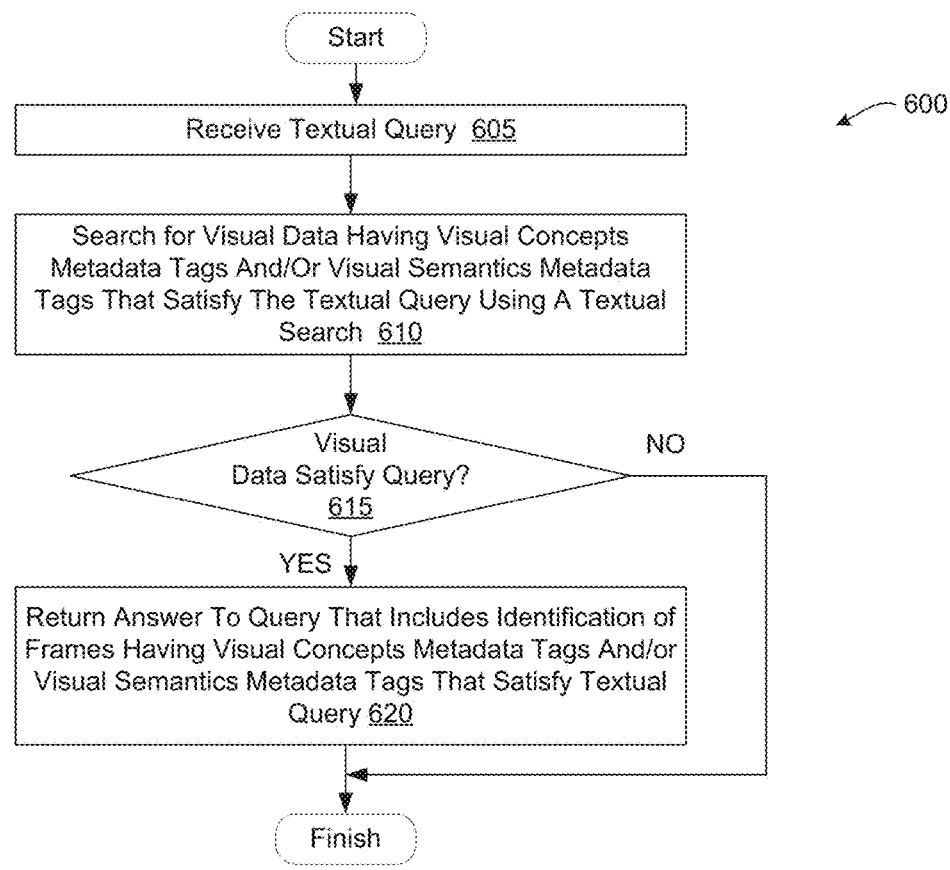
FIG. 6 is a flow diagram of one embodiment for a method of searching metadata tags associated with visual data.

FIGS. 4-6 are flow diagrams of various implementations of methods related to analyzing visual data to determine visual concepts and visual semantics to associate with the visual data. The methods are performed by processing logic that may include hardware (circuitry, dedicated logic, etc.), software (such as is run on a general purpose computer system or a dedicated machine), or a combination of both. In one implementation, the methods may be performed by visual content analysis system 300 of FIG. 3. Some operations and/or methods may be performed by a data center 220, while other operations and/or methods may be performed by a VCA system 235a-c of FIG. 2.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 4 is a flow diagram of one embodiment for a method 400 of training a visual content analysis system using machine learning. Method 400 may be performed by a training module of a visual semantics system, or may be performed by a separate training module. In one embodiment, method 400 is performed by processing logic running in a data center that has access to large amounts of processing resources.

At block 405 of method 400, training visual data is received. At block 408, processing logic trains a visual content analysis system to determine feature-level attributes. This may include generating dynamic foreground descriptors such as motion activity descriptors, region-based ART descriptors, average color descriptors, color moments descriptors and texture neighborhood descriptors. This may additionally include generating static background descriptors such as color layout descriptors, color structure descriptors, dominant color descriptors, scalable color descriptors, edge histogram descriptors and homogenous texture descriptors.

At block 410, processing logic trains the visual content analysis system to determine visual entities. This may include generating descriptors for each of the types of visual entities that may be encountered in an environment to be monitored. The descriptors may use feature-level attributes to identify visual entities in visual data.

At block 415, processing logic trains the visual content analysis system to determine visual concepts. This may include generating descriptors for each of the types of visual concepts that may be encountered in an environment to be monitored. This may be accomplished using one or more machine learning algorithms such as Kohonen maps, support vector machines (SVM), k-nearest neighbor classifiers, and so on. Each visual concept includes a pair of visual entities (a subject and an object) and a relationship between the visual entities (a predicate). Visual concepts may be defined using a resource description framework (RDF) triple of <resource (subject), property (predicate), value (object)>, which can be interpreted as: subject is related to object via predicate. For example, a visual concept for picking may be <"associate", "pick" "bin">, which states that one conceptual relationship between an associate and a bin is pick. Visual concepts not only allow complex events to be represented, but also enable aggregation of multi-modal data. The output of visual concept detectors can be combined with other modalities such as text queries and content-based retrieval.

At block 420, processing logic trains the visual content analysis system to determine visual semantics. This may include generating descriptors for each of the types of visual semantics that may be encountered in an environment to be monitored. Processing logic may generate visual semantics descriptors that link visual concepts via relationships such as interdependence, causality and independence.

At block 425, processing logic applies the trained visual content analysis system to fulfillment centers, warehouses or other locations having imaging systems.

FIG. 5 is a flow diagram of one embodiment for a method 500 of applying a visual content analysis system to visual data. At block 505 of method 500, processing logic receives a sequence of frames of video data or other visual data. At block 510, processing logic determines a set of feature-level attributes and generates feature-level attribute metadata tags for the frames. These feature-level attributes may be identified using a collection of feature-level attribute descriptors such as those described herein above. The feature-level attributes may include one or more attributes with a strong temporal component. Such feature-level attributes may be determined based on comparing multiple frames of video (e.g., a series of sequential frames) to identify similar groups of pixels between the frames and identify movement or other temporal events associated with these groups of pixels. For example, feature-level attributes may include motion as well as acceleration, velocity, and so forth.

A block 515, processing logic determines one or more visual entities in the frames from the feature-level attributes and generates visual entity metadata tags based on the determined visual entities. The visual entities may be determined by applying a set of visual entity descriptors to the visual data and the feature-level attributes.

At block 520, processing logic determines one or more visual concepts in the frames based on the visual entities and/or the feature-level attributes and generates visual concepts metadata tags. The visual concepts may be determined by applying a set of visual concepts descriptors to the visual data, the feature-level attributes and the visual entities. Each of the visual concepts defines a relationship between two or more visual entities. In one embodiment, a visual concept includes an object visual entity, a subject visual entity and a predicate that ties the object visual entity to the subject visual entity (and that defines a relationship between the object visual entity and the subject visual entity). Some of the visual concepts may have temporal components such that the relationship between visual entities represented in the visual concept is time dependent.

At block 525, processing logic determines one or more visual semantics in the frames based on the visual concepts and generates visual semantics metadata tags. The visual semantics may be based solely on the visual concepts or may be based on the visual concepts, the visual entities and/or the feature-level attributes in combination. The visual semantics may be determined by applying a set of visual semantics descriptors to the visual data, the visual concepts, the visual entities and/or the feature-level attributes.

At block 530, processing logic associates the metadata tags with the frames. This may include annotating the frames with the metadata tags. At block 535, processing logic transmits the metadata tags to a remote data store (e.g., to a data center). The metadata tags may be transmitted along with relationship information that identifies relationships between one or more of visual concepts, feature-level attributes, visual entities, and/or visual semantics. The metadata tags may be stored in a manner that enables them to be parsed and searched via textual and/or conceptual searches.

In one embodiment, at block 540 processing logic analyses the metadata tags and determines whether they satisfy any notification criteria. If so, the method continues to block 545, and processing logic generates a notification. Otherwise the method ends.

FIG. 6 is a flow diagram of one embodiment for a method 600 of searching metadata tags associated with visual data. At block 605 of method 600, processing logic receives a textual query. The textual query may include one or more visual concepts, visual entities, visual semantics and/or joins of any of the above that are to be searched for. Thus, the textual search may be a concept-level search of stored visual data. At block 610, processing logic searches for visual data having visual concepts metadata tags and/or visual semantics metadata tags that satisfy the textual query using a textual search. At block 615, processing logic determines whether any visual data having associated metadata tags that satisfy the query were identified. If such visual data was identified, then the method continues to block 620. Otherwise the method ends.

At block 620, processing logic returns an answer to the query that includes identification of the visual data having visual concepts and/or visual semantics metadata tags that satisfy the textual query. In some instances, the visual data (e.g., video frames and/or images) may be retrieved from storage and provided to a querying party. For some queries, query results may be aggregated and business logic questions relying on the query may be answered.

Figure 8:
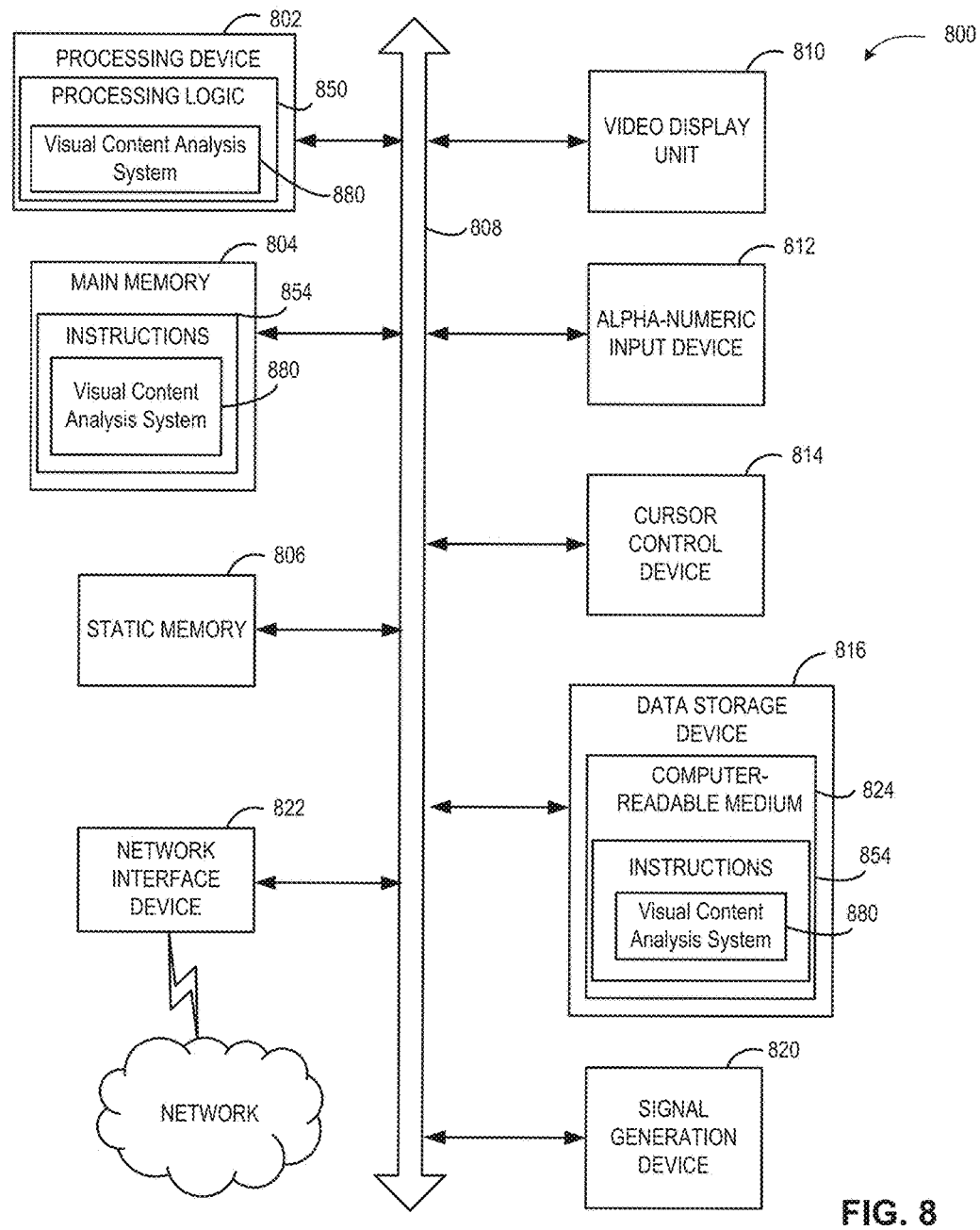
FIG. 8 is a block diagram of an example computing device, which may perform operations in accordance with embodiments of the present invention.

FIG. 8 is a block diagram of an example computing device 800, which may perform operations in accordance with embodiments of the present invention. A set of instructions for causing the computing device 800 to perform any one or more of the methodologies discussed herein may be executed by the computing device 800. The computing device 800 may correspond to a computing device of data center 220 or fulfillment center 204a-c of FIG. 2.

In embodiments of the present invention, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "computing device" shall also be taken to include any collection of machines (e.g., computers) that individually or jointly execute a set (or multiple sets) of instructions to perform any one or more of the methodologies discussed herein.

The exemplary computing device 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

The processing device 802 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 802 may therefore include multiple processors. The processing device 802 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 802 may also be one or more special-purpose processing devices such as an application specific integrated circuit (ASIC), a field programmable gate array (FPGA), a digital signal processor (DSP), network processor, or the like.

The computing device 800 may further include a network interface device 822. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-readable storage medium 824 on which is stored one or more sets of instructions 854 embodying any one or more of the methodologies or functions described herein (e.g., for a visual content analysis system 880 that determines visual contents and/or visual semantics). The instructions 854 may also reside, completely or at least partially, within the main memory 804 and/or within processing logic 850 of the processing device 802 during execution thereof by the computer system 800; the main memory 804 and the processing device 802 also constituting machine-readable storage media.

While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the computing device that cause the computing device to perform any one or more of the methodologies of the present invention. The term "computer-readable storage medium" shall accordingly be taken to include, but not be limited to, non-transitory media such as solid-state memories, and optical and magnetic media.

The modules, components and other features described herein (for example in relation to FIG. 3) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating", "determining", "receiving", "transmitting", "applying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   training a visual content analysis system based on applying training video data to a machine learning algorithm, wherein the visual content analysis system is hosted by a server located at a first fulfillment center of a plurality of fulfillment centers; and
   applying, by a processing device, the visual content analysis system to a plurality of frames of video data of a first data stream captured by one or more of a plurality of cameras monitoring a physical warehouse of the first fulfillment center, wherein applying the visual content analysis system to the plurality of frames of the video data comprises:
      detecting motion of a first object by comparing a first frame and a second frame of the plurality of frames;
      generating a first feature-level metadata tag identifying the motion;
      determining a first attribute describing the first object;
      generating a first metadata tag identifying the first object, the first attribute, and the first data stream;
      generating a first visual semantic metadata tag identifying a relationship between the first metadata tag and a second metadata tag identified based on a second data stream captured by one or more of the plurality of cameras;
      storing the first metadata tag, the first feature-level metadata tag, and the first visual semantic metadata tag in association with the video data in a local data store of the server located at the first fulfillment center; and
      transmitting, via a network, at least one of the first feature-level metadata tag, the first metadata tag, or the first visual semantic metadata tag to a remote server system, without transmitting the video data to the remote server system, wherein the remote server system uses at least one of the first feature-level metadata tag, the first metadata tag, or the first visual semantic metadata tag.

2. The method of claim 1, wherein the first metadata tag identifies at least one of a grouping concept, a path concept, an occupancy concept, a movement concept or an identification concept relating to the first object, and wherein the relationship comprises at least one of an interdependence relationship, a causality relationship or an independence relationship between the plurality of visual concepts in the one or more frames.

3. The method of claim 1, further comprising:
associating the first feature-level metadata tag, the first metadata tag, and the first visual semantic metadata tag with the plurality of frames.

4. A non-transitory computer readable storage medium having instructions that, when executed by a processing device, cause the processing device to perform operations comprising:
detecting motion of a first object by comparing a first frame and a second frame of a plurality of frames of a first data stream captured by one or more of a plurality of cameras monitoring a physical warehouse of the first fulfillment center;
generating a first feature-level metadata tag identifying the motion;
determining a first attribute describing the first object;
generating a first metadata tag identifying the first object, the first attribute, and the first data stream;
generating a first visual semantic metadata tag identifying a relationship between the first metadata tag and a second metadata tag identified based on a second data stream captured by one or more of the plurality of cameras;
storing the first metadata tag, the first feature-level metadata tag, and the first visual semantic metadata tag in association with the video data in a local data store of a server located at the first fulfillment center; and
transmitting, via a network, at least one of the first feature-level metadata tag, the first metadata tag, or the first visual semantic metadata tag to a remote server system, without transmitting the video data to the remote server system, wherein the remote server system uses at least one of the first feature-level metadata tag, the first metadata tag, or the first visual semantic metadata tag.

5. The non-transitory computer readable storage medium of claim 4, wherein the first visual semantic metadata tag represents one or more visual concepts.

6. The non-transitory computer readable storage medium of claim 4, wherein the first metadata tag comprises a temporal component that is based on the plurality of frames of the first data stream.

7. The non-transitory computer readable storage medium of claim 4, the operations further comprising:
training a visual content analysis system of the first fulfillment center based on applying training data to a machine learning algorithm to recognize one or more clusters of visual concepts based on from the first data stream; and
applying the visual content analysis system to the first data stream to determine the first visual semantic metadata tag.

8. The non-transitory computer readable storage medium of claim 4, wherein the first metadata tag identifies at least one of a grouping concept, a path concept, an occupancy concept, a movement concept or an identification concept relating to the first object; and wherein the relationship comprises at least one of an interdependence relationship, a causality relationship or an independence relationship between the plurality of visual concepts in the plurality of frames.

9. The non-transitory computer readable storage medium of claim 4, the operations further comprising:
generating a plurality of metadata tags based on the first data stream;
generating a plurality of visual semantics metadata tags based on the first data stream; and
associating the plurality of metadata tags and the plurality of visual semantics metadata tags with the first data stream.

10. The non-transitory computer readable storage medium of claim 9, the operations further comprising:
receiving the query;
in response to the query, searching a database comprising a plurality of visual semantic metadata tags comprising the first visual semantic metadata tag;
determining the first visual semantic metadata tag satisfies the query; and
generating a response to the query that comprises an identification of a subset of the first data stream corresponding to the first visual semantic metadata tag.

11. The non-transitory computer readable storage medium of claim 9, the operations further comprising:
generating an alert responsive to determining that the first visual semantic metadata tag satisfies a criterion, wherein the alert identifies a subset of the first data stream that caused the alert to be generated.

12. The non-transitory computer readable storage medium of claim 4, the operations further comprising:
determining a plurality of attributes for the first data stream; and
determining a plurality of visual entities in the first data stream based on the plurality of attributes.

13. A system comprising:
a plurality of cameras to generate a plurality of frames of video data of a first data stream associated with a physical warehouse of the first fulfillment center;
a data store, operatively coupled to the plurality of cameras, to store the plurality of frames of the video data; and
a processing device, coupled to at least one of the data store or the plurality of cameras, to process the plurality of frames of the video data, the processing device to:
detect motion of a first object by comparing a first frame and a second frame of the plurality of frames
generate a first feature-level metadata tag identifying the motion;
determine a first attribute describing the first object;
generate, a first metadata tag identifying the first object, the first attribute, and the first data stream;
generate a first visual semantic metadata tag identifying a relationship between the first metadata tag and a second metadata tag identified based on a second data stream captured by one or more of the plurality of cameras;
store the first metadata tag, the first feature-level metadata tag, and the first visual semantic metadata tag in association with the video data in a local data store of the server located at the first fulfillment center; and
transmit, via a network, at least one of the first feature-level metadata tag, the first metadata tag, or the first visual semantic metadata tag to a remote server system, without transmitting the video data to the remote server system, wherein the remote server system uses at least one of the first feature-level metadata tag, the first metadata tag, or the first visual semantic metadata tag.

14. The system of claim 13, the processing device to:
associate the first feature-level metadata tag, the first metadata tag, and the first visual semantic metadata tag with the plurality of frames.

15. The system of claim 14, the processing device to:
receive the query;
in response to the query, search a database comprising a plurality of visual semantic metadata tags comprising the first visual semantic metadata tag;
determine the first visual semantic metadata tag satisfies the query; and
generate a response to the query that comprises an identification of a subset of the first data stream corresponding to the first visual semantic metadata tag.

16. The system of claim 13, the processing device to:
generate an alert responsive to determining that the first visual semantic metadata tag satisfies a criterion, wherein the alert identifies a subset of the first data stream that caused the alert to be generated.

* * * * *